US006523746B2

(12) United States Patent
Kozak

(10) Patent No.: US 6,523,746 B2
(45) Date of Patent: Feb. 25, 2003

(54) ROLLER COUNTER FOR ARTICLES WITH TUBULAR FRAMES

(76) Inventor: David A. Kozak, 120 W. 8th St., Pennsburg, PA (US) 18073

( * ) Notice: Subject to any disclaimer, the term of this patent is extended or adjusted under 35 U.S.C. 154(b) by 0 days.

(21) Appl. No.: 09/875,295

(22) Filed: Jun. 6, 2001

(65) Prior Publication Data

US 2002/0186807 A1 Dec. 12, 2002

(51) Int. Cl.7 .................................................. G06F 7/08
(52) U.S. Cl. ...................................................... 235/425
(58) Field of Search ................................ 235/425, 419, 235/1 B, 1 C, 56; 108/53.1, 55.1; 271/213, 175

(56) References Cited

U.S. PATENT DOCUMENTS 4,006,831 A * 2/1977 Jimenez ...................... 271/213
4,381,563 A * 4/1983 Groom et al. ............. 324/73.1
4,399,991 A * 8/1983 Everall et al. ........... 198/465.3
4,876,977 A * 10/1989 Ando et al. ................. 112/445
4,892,050 A * 1/1990 Ando et al. ................. 112/445
5,267,827 A 12/1993 Provan et al.
5,348,149 A * 9/1994 McCarthy .................. 108/53.1
6,053,695 A 4/2000 Longoria et al.
6,064,829 A 5/2000 Okutsu et al.
6,342,028 B1 * 1/2002 de Sane ......................... 482/1

OTHER PUBLICATIONS

Search Report dated Aug. 21, 2002 for International Application No. PCT/US02/18206 dated Jun. 6, 2002.

* cited by examiner

*Primary Examiner*—Thien M. Le
(74) *Attorney, Agent, or Firm*—Ratner Prestia

(57) ABSTRACT

Counter for stacked articles, e.g., folding chairs. A wheel having a notched peripheral surface is connected to a count indicator. The wheel and counter interact so that when a user places the wheel with a notch at the lowermost of the stacked articles and the wheel is rotated by moving the counter vertically against the stack, each time a successive notch is moved the count indicator registers the next highest number.

18 Claims, 5 Drawing Sheets

ROLLER COUNTER FOR ARTICLES WITH TUBULAR FRAMES

BACKGROUND OF THE INVENTION

The present invention pertains to a device for counting stacked elongated articles, in particular a stack of folding chairs.

Persons engaged in providing seating for large events whether they be contained in an outdoor tent or in a large hall supply, among other things, tables and chairs. Suppliers of such equipment generally utilize folding chairs which are made of tubular metal and which are stacked on a movable cart so that they can be conveyed to a particular site, off loaded and set up. One of the things that providers of such equipment must be attentive to is the fact that they have the proper number of chairs for a given event and that after the event is over that they inventory the chairs to make sure that they recover all of their equipment. This means that the chairs must be physically counted and sometimes recounted to make sure the requisite number of chairs are either delivered or accounted for.

Counting of chairs by hand is a tedious and time consuming function.

SUMMARY OF THE INVENTION

The present invention combines a counter indicator with a rotating wheel having notches equally spaced around the periphery so that a notch can engage individual elongated members. The counter and wheel are arranged on a handle so that the user can engage a single notch on the lower most member and roll the counter vertically thus contacting each tubular member in succession. The notches and the counter are connected so that each time a notch is rotated into the next position an additional count is added to the counter. The counter can be a mechanical counter such as used for counting persons entering through a turnstile, or an electronic counter, devices which are well known in the art.

Therefore, in one aspect, the present invention is an apparatus for rapidly counting stacked articles having a generally circular cross-section comprising in combination: a generally elongated handle having a first end and a second end; a generally circular article engaging device rotatably mounted on the first end of the handle, the article engaging device having a plurality of semi-circular shaped notches on a peripheral surface of the article engaging device, the notches adapted to engage individual stacked articles, a counting indicator mounted on the handle and connected to the article engaging device, the counter and the article engaging device selected so that each time the article engaging device is moved to another stacked article the counter moves one unit; whereby when the article engaging device is placed against the lowermost of the stacked articles and the article engaging device is moved upwardly, an accurate count of the number of stacked articles is rapidly effected.

In another aspect, the present invention is an apparatus for rapidly counting a stack of folding chairs made from tubular material with a generally circular cross-section comprising in combination: a generally elongated handle having a first end and a second end; a generally circular article engaging device rotatably mounted on the first end of the handle, the article engaging device having a plurality of semi-circular shaped notches on a peripheral surface of the article engaging device, the notches adapted to engage individual stacked articles, and a counting indicator mounted on the handle and connected to the article engaging device, the counter and the article engaging device selected so that each time the article engaging device is moved to another stacked article the counter moves one unit; whereby when said article engaging device is placed against the lowermost of the stacked articles and the article engaging device is moved upwardly, an accurate count of the number of stacked articles is rapidly effected.

In yet another aspect, the present invention is an apparatus for rapidly counting elongated articles stacked in an array with separation between adjacent elongated articles comprising in combination: a generally elongated handle having a first end and a second end; a generally circular article engaging device rotatably mounted on the first end of the handle, the article engaging device having a plurality of semi-circular shaped notches on a peripheral surface of the article engaging device, the notches adapted to engage individual stacked articles, and a counting indicator mounted on the handle and connected to the article engaging device, the counter and the article engaging device selected so that each time the article engaging device is moved to another stacked article the counter moves one unit; whereby when the article engaging device is placed against the lowermost of the stacked articles and the article engaging device is moved upwardly, an accurate count of the number of stacked articles is rapidly effected.

DETAILED DESCRIPTION OF THE INVENTION

Figure 1:
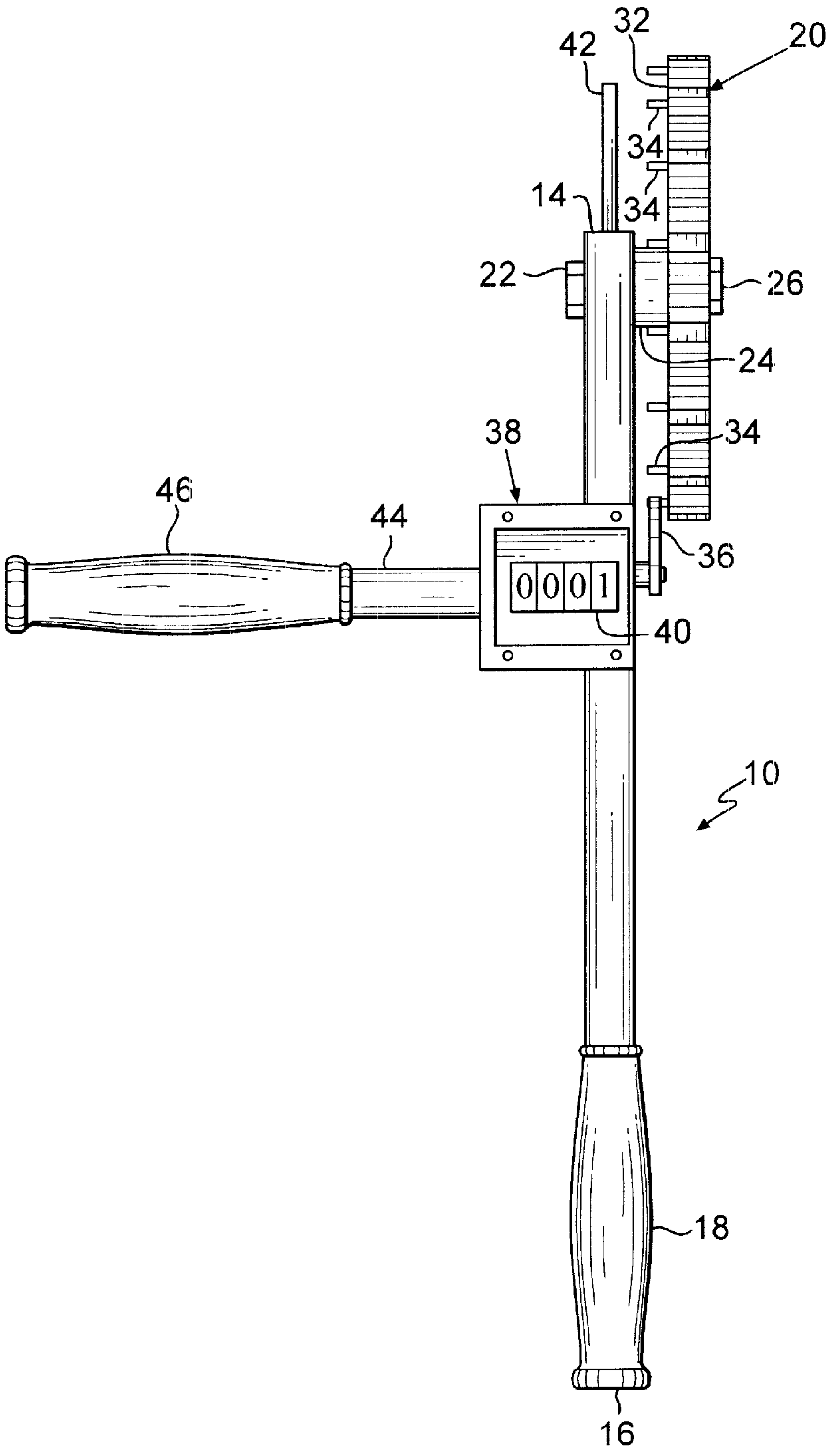
FIG. 1 is a top plan plan view of the device of the present invention.
Figure 2:
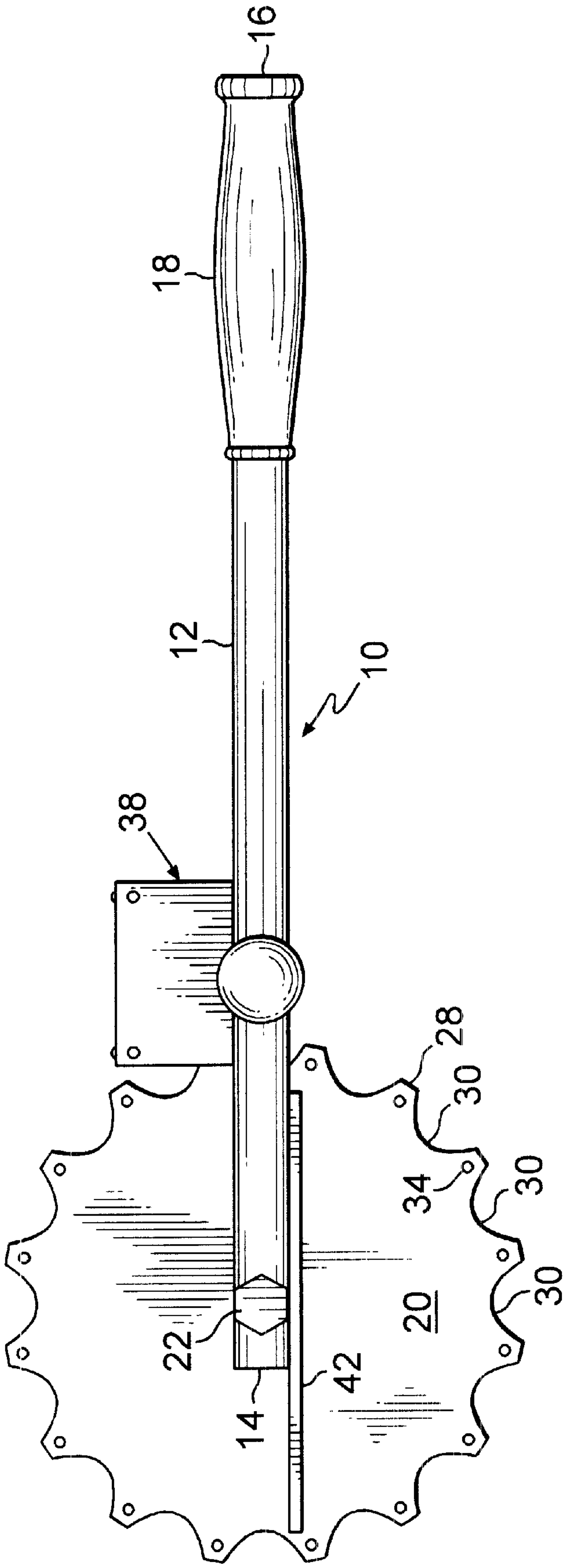
FIG. 2 is a left side elevational view of the device of FIG. 1.
Figure 3:
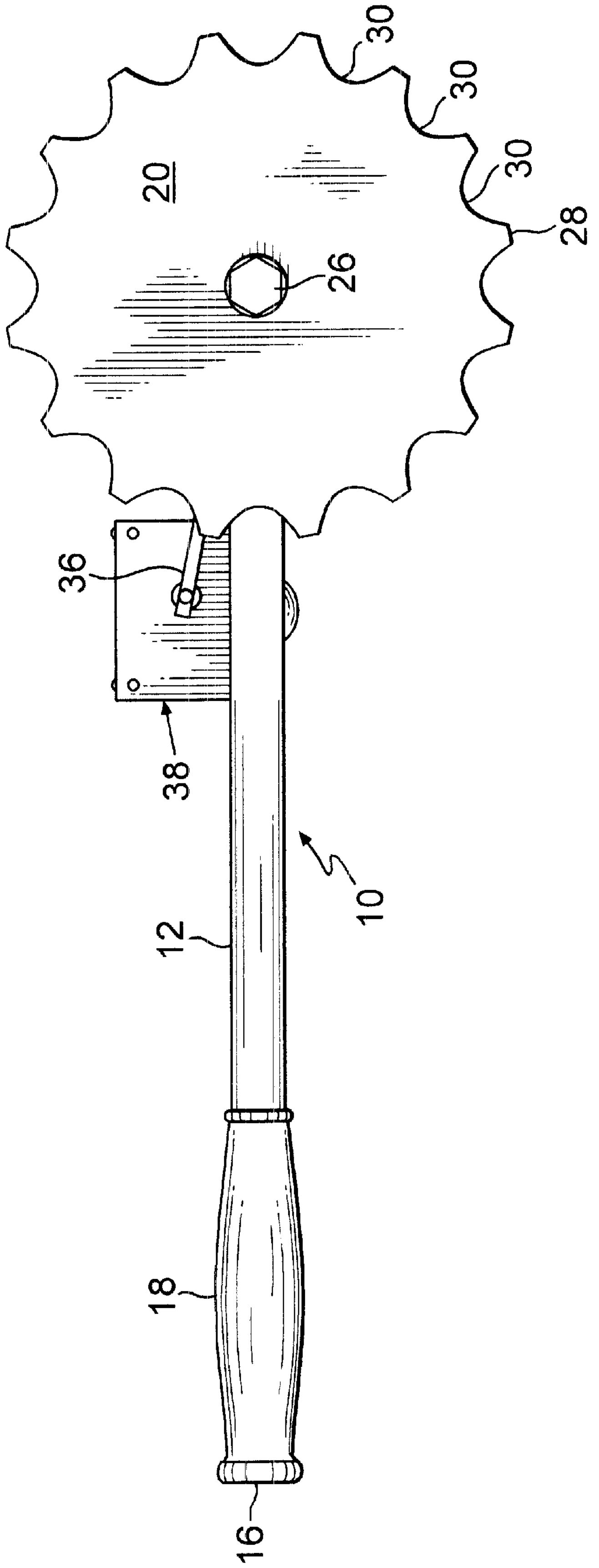
FIG. 3 is a right side elevational view of the device of FIG. 1.

Referring to FIGS. 1, 2, and 3 a counting apparatus according to present invention is generally referred to as 10. Counting apparatus 10 includes an elongated handle 12 having a first end 14 and a second and 16. A grip aid 18 such as used on bicycle handle bars can be affixed to the second end 16 of the handle 12 to provide comfort and grip for a user.

Disposed on the first end 14 of handle 12 is a notched wheel 20 adapted to rotate freely about a central axis 22 which is fixed through a suitable collar 24 and nut 26 onto handle 12. The peripheral surface 28 of wheel 20 includes a plurality of equally spaced notches 30 that are adapted to engage the devices being counted. In other words if the device 10 is used to count stacked chairs made from a tubular material the notches 30 are made so that each notch will engage a portion of the surface of a tubular member of the chair. The notches can be semi-circular in cross-section as shown in FIGS. 2 and 3. On an inner face 32 of wheel 20 and spaced between each notch 30 is a protruding pin 34. The pin 34 can extend through the wheel 20 and be anchored therein by an interference fit, welding, threaded apertures and the like. The pins 34 are adapted to communicate with the actuator 36 of counter 38 so that each time a pin strikes the actuator 34 the next higher number is registered on the indicator, e.g., dial indicator 40 of counter 38. Such counters are well known in the art and used for a variety of purposes. Hand held counters where the activator is moved by an individuals thumb or finger that are used for doing traffic surveys and for counting persons entering an event, or a ride at an amusement park are well known. Such counters are also used in combination with a wheel to measure distances around the periphery of a piece of property or distances at the scene of an accident, as is well known in the art. Counter 38 is fixed to handle 10 in any convenient manner as by bolting, welding, adhesives or the like.

On the first end 14 of handle 12 is a positioning device 42 which extends from the first end of 14 of handle 10 to a position that is adjacent the lowest portion of each notch 30 on wheel 20 as shown in FIG. 2. The positioning device 42 can be a rod fixed to the handle 12 in any convenient manner and is preferably made of a durable material that will not show excessive wear in use.

An auxiliary handle 44 can be fixed to handle 12 by being threaded into a suitable aperture in handle 12 or any other convenient fastening means, as would be apparent to a worker skilled in the art. Handle 44 is placed at a right angle to handle 12 so that the user of the device 10 can steady the devices as will hereinafter be more fully explained. The outward end of auxiliary handle 44 can have a gripping device 46 which is similar to gripping device 18 on handle 12.

Figure 4:
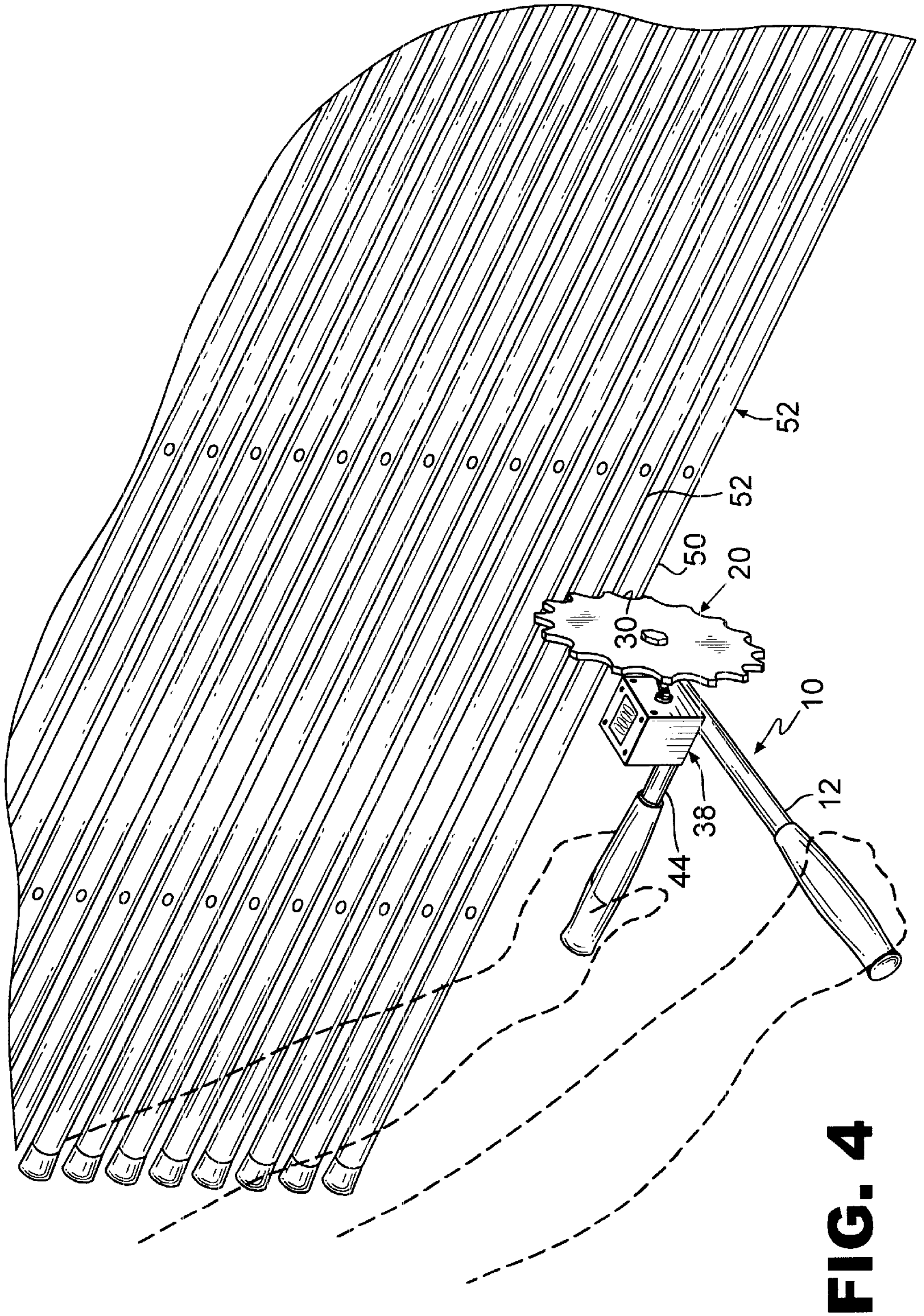
FIG. 4 is schematic representation of the device of FIG. 1 placed in a beginning position during use.
Figure 5:
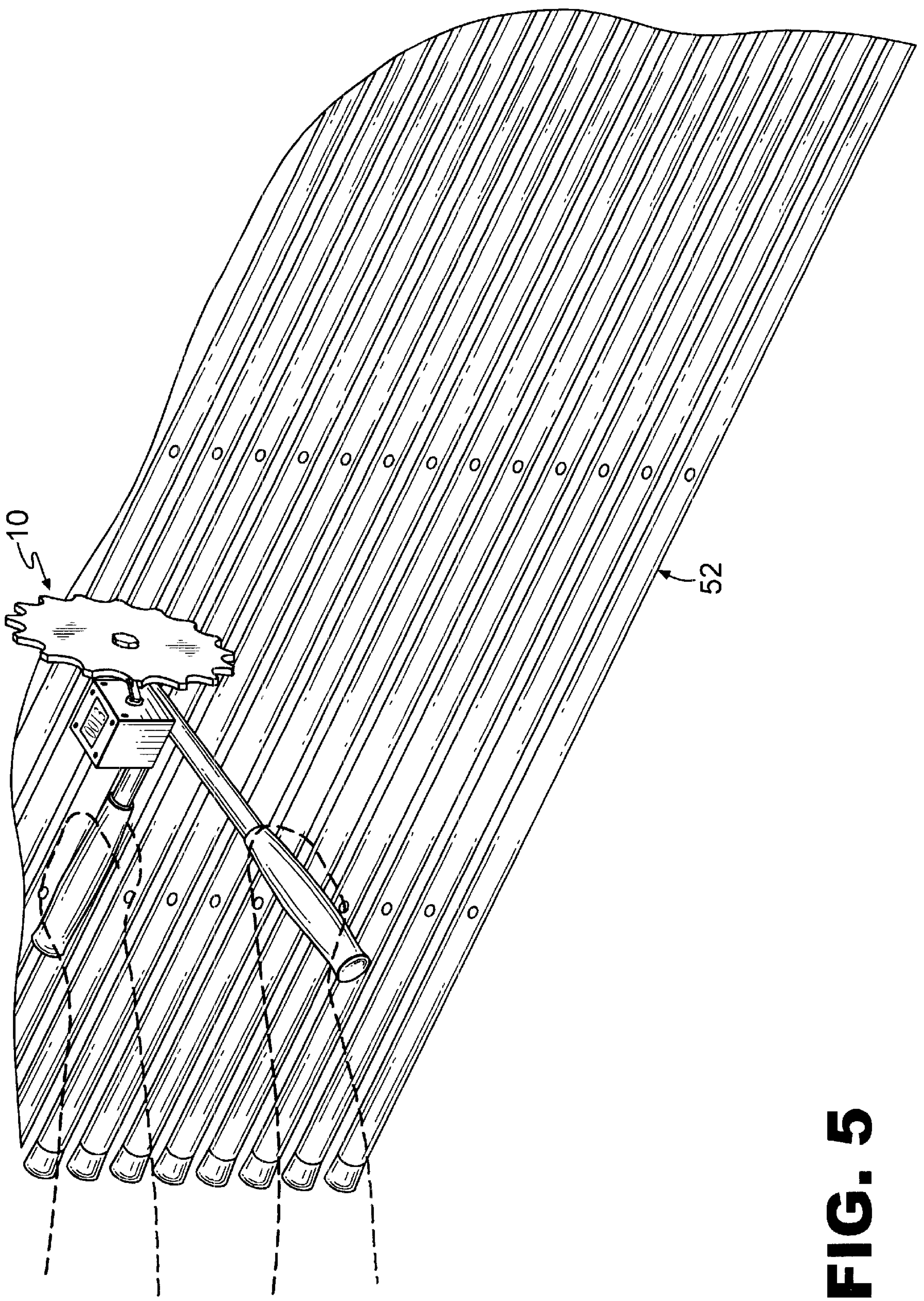
FIG. 5 is a schematic representation of the device of FIG. 1 in an intermediate position during use of the device.

Referring to FIG. 4 a user positions the device 10 at the lower most member 50 of stacked array 52 with the indicator 38 set at 1. In this position the wheel 32 is placed so that a peripheral notch 30 is centered on the lower most tubular member 50. The user whose arms are shown in dotted lines can use the handle 12 and auxiliary handle 44 to steady the device 10. The user then rolls the wheel 22 upwardly in a vertical direction so that the next successive notch touches the next tubular member 52 in the array moving the counter 1 position. As shown in FIG. 5 the user continues vertical movement of the device 10 until the top of the stacked array 52 is reached and at that point the total number of members in the stack has been counted.

It is apparent that using the device according to the present invention provides the user with a method and apparatus to rapidly count a stacked array of elongated members such as tubes and the like.

In particular the device of the present invention is a vast improvement over hand counting for those persons engaged in providing folding chairs for rent to individuals, organizations or businesses.

In addition to using the device to count chairs any stacked array of materials with a regular cross-section, where there is a space between successive members of the stack can be counted using such a device. For example, square tubular members in a stacked array could be counted. However, in this instance the shape of the notches on the periphery of the wheel will have to be changed.

In a like manner hexagonal or octagonal or any shaped tube between a square and circular cross-section can be counted providing the proper configuration of the periphery of wheel 22 is made.

Having thus described my invention what is desired to be secured by letters patent of the United States is set forth in the appended claims and should be read without limitation.

What is claimed:

1. An apparatus for rapidly counting stacked articles having a generally circular cross-section comprising in combination:

a generally elongated handle having a first end and a second end;

a generally circular article engaging device rotably mounted on said first end of said handle, said article engaging device having a plurality of semi-circular shaped notches on a peripheral surface of said article engaging device, said notches adapted to engage individual stacked articles; and a counting indicator mounted on said handle and connected to said article engaging device, said counter and said article engaging device selected so that each time said article engaging device is moved to another stacked article said counter moves one unit, whereby when said article engaging device is placed against the lowermost of said stacked articles and said article engaging device is moved upwardly, an accurate count of the number of stacked articles is rapidly effected.

2. An apparatus according to claim 1 including an article positioning indicator on said handle and extending forward for a distance from proximate said first end of said handle to a location defined by a bottom of said notches on said article engaging device.

3. An apparatus according to claim 1 including an auxiliary handle positioned at a right angle to said handle and on a side of said handle opposite to said article engaging device.

4. An apparatus according to claim 3 where said auxiliary handle is positioned approximately one-third the distance from said first end of said handle.

5. An apparatus according to claim 1 wherein said second end of said handle has a removable handle grip.

6. An apparatus according to claim 3 wherein said auxiliary handle has a first end fixed to said handle and a second end having thereon a removable handle grip.

7. An apparatus for rapidly counting a stack of folding chairs made from tubular material with a generally circular cross-section comprising in combination:

a generally elongated handle having a first end and a second end;

a generally semi-circular article engaging device rotably mounted on said first end of said handle, said article engaging device having a plurality of semi-circular shaped notches on a peripheral surface of said article engaging device, said notches adapted to engage individual stacked articles; and a counting indicator mounted on said handle and connected to said article engaging device said counter and said article engaging device selected so that each time said article engaging device is moved to another stacked article said counter moves one unit; whereby when said article engaging device is placed against the lowermost of said stacked articles and said article engaging device is moved upwardly, an accurate count of the number of stacked articles is rapidly effected.

8. An apparatus according to claim 7 including an article positioning indicator on said handle and extending forward for a distance from proximate said first end of said handle to a location defined by a bottom of said notches on said article engaging device.

9. An apparatus according to claim 7 including an auxiliary handle positioned at a right angle to said handle and on a side of said handle opposite to said article engaging device.

10. An apparatus according to claim 9 where said auxiliary handle is positioned approximately one-third the distance from said first end of said handle.

11. An apparatus according to claim 7 wherein said second end of said handle has a removable handle grip.

12. An apparatus according to claim 9 wherein said auxiliary handle has a first end fixed to said handle and a second end having therein a removable handle grip.

13. An apparatus for rapidly counting elongated articles stacked in an array with separation between adjacent elongated articles comprising in combination:

a generally elongated handle having a first end and a second end;

a generally circular article engaging device rotatably mounted on said first end of said handle, said article engaging device having a plurality of semi-circular shaped notches on a peripheral surface of said article engaging device, said notches adapted to engage individual stacked articles; and a counting indicator mounted on said handle and connected to said article engaging device said counter and said article engaging device selected so that each time said article engaging device is moved to another stacked article said counter moves one unit; whereby when said article engaging device is placed against the lowermost of said stacked articles and said article engaging device is moved upwardly, an accurate count of the number of stacked articles is rapidly effected.

14. An apparatus according to claim 13 including an article positioning indicator on said handle and extending forward for a distance from proximate said first end of said handle to a location defined by a bottom of said notches on said article engaging device.

15. An apparatus according to claim 13 including an auxiliary handle positioned at a right angle to said handle and on a side of said handle opposite to said article engaging device.

16. An apparatus according to claim 15 where said auxiliary handle is positioned approximately one-third the distance from said first end of said handle.

17. An apparatus according to claim 13 wherein said second end of said handle has a removable handle grip.

18. An apparatus according to claim 15 wherein said auxiliary handle has a first end fixed to said handle and a second end having therein a removable handle grip.

* * * * *